(12) United States Patent
Dees et al.

(10) Patent No.: US 10,091,826 B2
(45) Date of Patent: Oct. 2, 2018

(54) WIRELESS LAN CONNECTION HANDOVER BY DOCKING SYSTEM AND GENERIC NETWORK DEVICE DRIVER

(75) Inventors: Walter Dees, Eindhoven (NL); Koen Johanna Guillaume Holtman, Eindhoven (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 289 days.

(21) Appl. No.: 14/344,065

(22) PCT Filed: Sep. 13, 2012

(86) PCT No.: PCT/IB2012/054766
§ 371 (c)(1),
(2), (4) Date: Mar. 11, 2014

(87) PCT Pub. No.: WO2013/038359
PCT Pub. Date: Mar. 21, 2013

(65) Prior Publication Data
US 2015/0016417 A1    Jan. 15, 2015

Related U.S. Application Data

(60) Provisional application No. 61/533,909, filed on Sep. 13, 2011.

(51) Int. Cl.
*H04W 76/12* (2018.01)
*G06F 1/16* (2006.01)
*H04W 36/14* (2009.01)
*H04W 88/08* (2009.01)
*H04W 92/10* (2009.01)

(52) U.S. Cl.
CPC .......... *H04W 76/12* (2018.02); *G06F 1/1632* (2013.01); *G06F 1/1698* (2013.01); *H04W 36/14* (2013.01); *H04W 88/08* (2013.01); *H04W 92/10* (2013.01)

(58) Field of Classification Search
USPC ........................................... 370/331
See application file for complete search history.

(56) References Cited

U.S. PATENT DOCUMENTS

| 5,923,757 | A | * | 7/1999 | Hocker | G06F 1/3259 341/22 |
| 6,678,535 | B1 | | 1/2004 | Narayanaswami | |
| 8,254,992 | B1 | * | 8/2012 | Ashenbrenner | G06F 1/1632 455/41.2 |
| 2003/0045236 | A1 | | 3/2003 | Chang | |
| 2006/0233191 | A1 | * | 10/2006 | Pirzada | H04W 88/00 370/463 |

(Continued)

OTHER PUBLICATIONS

"Wi-Fi Direct: Safe for Hospital Use?", pp. 1-2, May 20, 2011, http://summit4med.com/forum/?p=49.
"Wi-Fi Direct Launches Today, is Security an Issue?", TekGoblin Technology and Gaming News and Reviews, pp. 1-10, Oct. 25, 2010 http://www.tekgoblin.com/2010/10/25/wi-fi-direct-launches-today-is-security-an-issue/.

(Continued)

*Primary Examiner* — Charles C Jiang
*Assistant Examiner* — Kyaw Z Soe
(74) *Attorney, Agent, or Firm* — Larry Liberchuk

(57) ABSTRACT

In a wireless environment, a dockee informs a docking station of the dockee's access point connection credentials and parameters in order for the docking station to become an intermediate proxy for the connection between the dockee and the access point. The docking station takes over the connection between the dockee and the access point.

15 Claims, 4 Drawing Sheets

(56) References Cited

U.S. PATENT DOCUMENTS

| | | | |
|---|---|---|---|
| 2006/0258300 A1 | 11/2006 | Chan | |
| 2007/0097934 A1* | 5/2007 | Walker | H04L 63/0428 370/338 |
| 2008/0195788 A1 | 8/2008 | Tamir | |
| 2010/0049005 A1 | 2/2010 | Espina Perez | |
| 2010/0057969 A1* | 3/2010 | Meiri | G06F 1/1632 710/303 |
| 2010/0069008 A1* | 3/2010 | Oshima | H04W 4/02 455/41.3 |
| 2010/0137028 A1 | 6/2010 | Farris | |
| 2011/0298736 A1* | 12/2011 | Madonna | G06F 1/1632 345/173 |
| 2012/0099566 A1* | 4/2012 | Laine | H04M 1/7253 370/338 |
| 2012/0265913 A1* | 10/2012 | Suumaki | H04W 4/08 710/303 |
| 2014/0242911 A1* | 8/2014 | Holtman | G06F 1/1632 455/41.1 |
| 2014/0351602 A1* | 11/2014 | Lee | H04L 63/04 713/189 |

OTHER PUBLICATIONS

Needle, D., "Wi-Fi Direct Already Has an Audience", Internetnews. com, pp. 1-4, Jan. 7, 2010 http://www.internetnews.com/software/article.php/3856991/Wi-Fi-Direct-Already-Has-an-Audience.htm.

Motta R. et al., "Wireless P2P: Problem or Opportunity?", Department of Computer Science and Engineering, University of California, AP2PS 2010 The Second International Conference on Advances in P2P Systems, pp. 32-37.

Murph, D., "Wi-Fi Direct Enabling P2P Communications Amongst WiFi Wares, Scaring Bluetooth Half to Death", Oct. 14, 2009, pp. 1-3, http://gadgetorium.net/gadget-news/wi-fi-direct-enabling-p2p-communications-amongst-wifi-wares-scaring-bluetooth-half-to-death. html.

"Wi-Fi Peer-to-Peer (P2P) Technical Specification", Wi-Fi Alliance Technical Committee P2P Task Group, Draft Version1.0.6, 2010 Wi-Fi Alliance, pp. 1-159.

Wireless Docking Standard, "A Standard for Connecting a Portable Device with a Group of High-End Peripherals", Aug. 5, 2010.

Adda M. et al, "Seamless Roaming Between GPRS and WiFi Networks", for presentation at the 1st Thailand Computer Science Conference, Thailand, Dec. 16-17, 2004.

* cited by examiner

WIRELESS LAN CONNECTION HANDOVER BY DOCKING SYSTEM AND GENERIC NETWORK DEVICE DRIVER

This invention relates to docking devices and systems and, more particularly, to a method and a system for the handover of a wireless LAN connection and incorporating a generic driver in a docking device.

Wireless docking uses wireless technologies to connect portable devices, such as mobile phones, laptops, etc., within stationary docking environments. In this document, such a portable device is called a dockee or wireless dockee. The wireless docking environment gives the dockee access to peripherals, such as a larger screen, a keyboard, a mouse, and input/output ports, that can be used to improve the experience and the productivity of the end user when interacting with applications running on the dockee. One representative case for wireless docking is to give the user of a mobile phone the ability to use a bigger screen when interacting with an application running on the mobile phone. For example, the user of a docked mobile phone uses a TV or PC monitor when interacting with an e-mail client or web browser running on the mobile phone.

The dockee connects wirelessly to one or more wireless docking stations—also known as wireless docking hosts—in order to gain access to the peripherals in the wireless docking environment. In the most simple case, the wireless docking environment is realized by having at a location, for example in a living room, on a desk in an office, etc, a single wireless docking station, to which peripherals like TVs, PC monitors, keyboards, etc. are all connected. In one specific example, a Bluetooth wireless keyboard and a USB webcam could be connected to permanently paired with—a docking station in order to become part of a docking environment.

An exemplary docking environment is shown in FIG. 1. A dockee device 110 may be in communication with access point 130 via link 115 and also docked with docking station 120 via link 125. The link 115 connects dockee device 110 to the access point 130. This connection provides the dockee device 110 access to, for example, a network 160 to which the access point 130 is attached. Network 160 may also provide access to the Internet, a LAN, etc. The link 125 to the docking station may provide the dockee device 110 access to, for example, the printer 140 and monitor 150.

The docking station 120 may be realized in many ways. It could be a specially designed single-purpose device or a PC, for example, running specific software. The PC may also have some extra hardware attached to make docking more convenient and/or efficient. A HDTV or some other multimedia device might also have built-in functionality to act as a docking station.

With regard to the link 115 and link 125, in practical terms, Wi-Fi will be the most logical wireless protocol to enable wireless docking and connectivity to the access point, as many dockee devices come with Wi-Fi support already built-in. However, while a dockee device may have Wi-Fi built in, a full wireless docking system that aims to ensure cross-device and cross-manufacturer compatibility between different dockees and docking stations in a user-friendly way is defined by a set of mechanisms or protocols between dockees and docking stations that realize easy and convenient automatic Wi-Fi connection setup between the dockee and the docking hosts with their associated peripherals.

Certain inventive embodiments will be discussed herein with reference to this docking environment and a communication standard for devices that can perform wireless docking. For example, one solution is to use Wi-Fi Direct P2P (a.k.a. Wi-Fi Peer-to-Peer) as the primary connection between the dockee device 110 and the docking station 120 (link 125) together with a set of defined protocols between the dockee device 110 and the docking station 120 which advantageously provide easy, convenient automatic connection setup between the dockee device and the peripherals connected to the docking station.

Although the defined Wi-Fi Direct P2P allows for simultaneously having a P2P connection to one device, for example, docking station 120, as well as having a connection to a Wi-Fi Access point 130 to access the network 160, this can often conflict with the need for bandwidth between the dockee device 110 and the docking station 120. The bandwidth requirements for tunneling various traffic types, such as high resolution low-latency display output, high quality audio output, and USB input is so high that the dockee device 110 should use the entire capacity and frequency range of its Wi-Fi antenna for the Wi-Fi connection with the docking station 120. Thus, the connections shown in FIG. 1, that are sharing the Wi-Fi capacity to simultaneously keep both a Wi-Fi connection open with the docking station 120 and a Wi-Fi connection open with the WLAN Access Point 130, are not the most preferred option in many cases.

Thus, a docking environment where the dockee device 110 maintains two open connections simultaneously has the problem of bandwidth limitations, which may saturate the Wi-Fi channel used by the access point to provide regular Internet access services to all other devices in the area. This environment may also suffer from increased cost and complexity by requiring a frequency hopping scheme or two antennas/radios on the dockee 110 to support the two connections at full capacity.

Certain embodiments herein advantageously allow the dockee device to maintain one connection to, for example, the docking station. The docking station acts as an intermediary device by allowing the dockee device to connect to the access point through the docking station (see FIG. 2). The user may be using an application on the dockee device that requires a connection to the access point, for example to discover DLNA devices (Digital Living Network Alliance®) in the home network, while also being connected to a printer connected to the docking station. It would be very beneficial if the docking station were able to act as a proxy towards the access point, thereby being an intermediate node to connect the dockee to the access point (see FIG. 2).

Using an intermediate node to connect to an access point is done by WLAN repeaters and bridges. However, those techniques are directed to extending the range of a wireless access point. A WLAN bridge/repeater takes over the "role" of the original access point and exposes itself as an access point—typically with the same Service Set Identifier (SSID) as the original access point. The dockee device can set up a connection to the WLAN bridge/repeater, which, in turn, forwards the traffic to the original access point. This usage is known as "Wireless Distribution System." Also known in the existing literature are systems, whereby sessions of one wireless system (e.g. GPRS) are seamlessly handed over to another wireless system (e.g. Wi-Fi). This re-configuration of connections takes place at the wireless device (e.g. phone) and does not involve an external docking station device.

In contrast according to the invention, the wireless docking host does not act as a repeater or bride, since it does NOT connect directly to the access point, and offer the connection facility to the dockee device. In the wireless docking case the scenario is different. When the dockee device enters into the range of an access point, e.g. a home, the dockee device may be configured to connect to a certain access point, i.e. it knows the SSID, the security credentials, etc., to set up the connection to the certain access point. Upon connection to the certain access point, the dockee device may, for example, be able to discover DLNA devices in the WLAN network that are connected to the same access point. Having the dockee provide the security credentials ensures that the dockee is allowed to access the given network, without the user having to set up the security to connect to the access point all over again.

However, a problem exists in a network which contains multiple access points and possibly multiple docking stations. For example, an office environment may contain such a network environment, where multiple access points and docking stations exist within a LAN. If the dockee device connects to an access point and then attempts to connect to a docking station, the docking station does not necessarily know to which access point the dockee device is connected within the LAN network.

Thus, according to an inventive embodiment described herein the dockee informs the docking station of the dockee's access point connection credentials and parameters in order for the docking station to become an intermediate proxy for the connection between the dockee and the access point. The docking station will "take over" the connection between the dockee and the access point. When the docking station "takes over" the connection, the dockee with have access to the docking station and to the access point (see FIG. 2).

Note that this inventive embodiment is different from using a traditional proxy connection. A proxy connection in the traditional sense typically requires a manual action and is done statically. Users normally do not switch between a proxy connection and a direct connection, and there are no automatic handover procedures or protocols in place for existing systems. Furthermore, in typical proxy protocols, the proxy starts out being trusted as a party in the network by both parties it mediates between. In the present case, the trust (security credentials) between the docking station and the access point is not present at the start, and according to this inventive embodiment, the docking station becomes a trusted party to the access point by using the credentials of the dockee. Therefore, in existing systems, in order to switch between a direct connection and a proxy connection, the user must first disconnect the existing direct connection, and then establish a new proxy connection afresh with a new set of network credentials. Thus, the traditional proxy approach in existing systems cannot provide a seamless handover between the two connections shown in FIG. 1—that is, handing over the connection 115 to the docking station and having the docking station 120 "take over" the direct connection 115 that the dockee device 110 previously had with the access point 130.

In one embodiment, the invention described herein relates to a wireless docking system for docking a dockee device with a docking station, the docking station includes: a first network connection for connecting to the dockee device; a second network connection for connecting to a wireless network access point; and a plug-in network interface device, wherein, upon establishing a connection with the dockee device, the docking station is configured to: receive from the dockee device information for accessing the wireless network access point, and take over a connection between the dockee device and the wireless network access point by connecting to the access point using the network credentials provided by the dockee device for that connection and by tunneling the traffic between the dockee device and the wireless network access point. The plug-in network interface device can be a physically plugged in device (e.g. USB dongle), a physically connected device, or a virtual/virtualized network interface device that shares a physical network interface device with other virtual/virtualized network interface devices.

In the above inventive embodiment the docking station may be required to support two Wi-Fi radios. However, not all wireless docking stations may come with two Wi-Fi radios built-in. Therefore, in another inventive embodiment the wireless docking stations may support a plug-in network interface which advantageously provides the wireless docking station with a second Wi-Fi radio.

Furthermore, as wireless technology evolves, competing versions of the next generation wireless standard are being developed. Therefore, having a plug-in network interface has the advantage that any new version of the wireless standard may be implemented in a plug-in network interface without the need to retrofit or replace the existing docking station.

Therefore, in another embodiment, the invention relates to a wireless docking system for docking a dockee device with a docking station, the docking station includes: a first network circuit for connecting to the dockee device; a second network circuit for connecting to a wireless network access point; and a plug-in network interface device; wherein, upon establishing a connection with the dockee device, the docking station is configured to: receive from the dockee device information for accessing the wireless network access point, and take over a connection between the dockee device and the wireless network access point by connecting to the access point using the information received from the dockee device for that connection and by tunneling the traffic between the dockee device and the wireless network access point, wherein the dockee device comprises a remote device driver and the docking station comprises a generic device driver of a peripheral device connected to the docking station, the generic device driver being controlled by the remote device driver for sending data from the dockee device to the peripheral device via a wireless connection between the dockee device and the plug-in network interface device.

In a further embodiment, the invention relates to a method for docking a dockee device with a docking station wirelessly, the method including: establishing a connection between the dockee device and the docking station via a first network connection; receiving by the docking station from the dockee device information for accessing the wireless network access point; taking over by the docking station a connection between the dockee device and the wireless network access point by connecting to the access point via a second network connection, using the information received from the dockee device for that connection and by tunneling the traffic between the dockee device and the wireless network access point; controlling a generic device driver in the docking station by a remote device driver in the dockee device for sending data from the dockee device to a peripheral device connected to the docking station via a wireless connection between the dockee device and a plug-in network interface device in the docking station.

In general the various aspects of the invention may be combined and coupled in any way possible within the scope of the invention. The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

Figure 1:
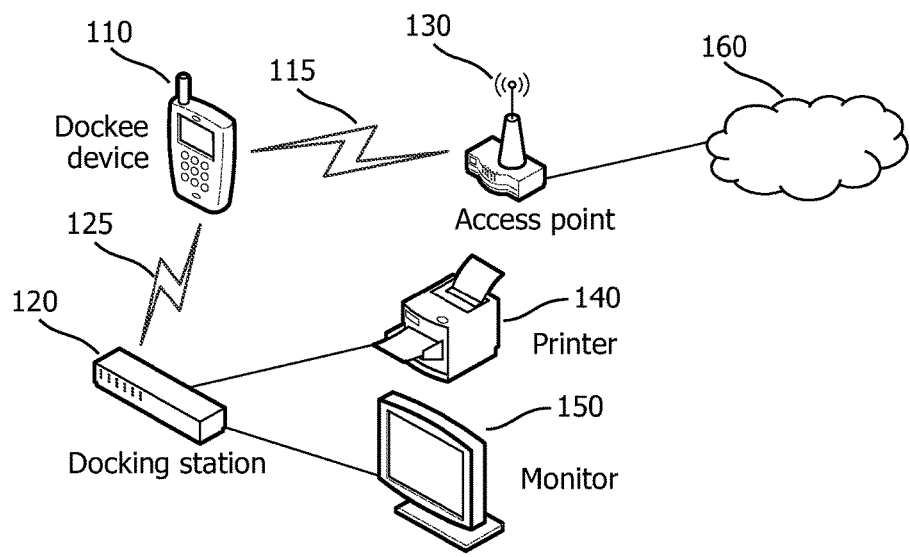
FIG. 1 shows a network environment of docking and connecting to an access point according to an inventive embodiment.

FIG. 1 shows a network environment where a dockee device 110 is within wireless range to connect to an access point 130. The access point 130 may be, for example, a Wi-Fi access point. When the dockee 110 enters into the range of the access point 130, the dockee 110 connects to the access point 130 via connection 115. Dockee 110 may wish to dock with docking station 120 over link 125, as described in detail with reference to FIG. 2. The docking station 120 is connected to peripheral devices, such as a printer 140 and a large screen monitor 150.

As discussed above, the dockee device 110 transfers the settings for the connection to the access point 130 to the docking station 120 in order to maintain one connection, instead of a connection to each of the access point 130 and the docking station 120. The docking station acts as an intermediary device by allowing the dockee device 110 to transfer the connection to the access point to the docking station (see FIG. 2).

Since the docking station 120 does not know to which access point 130 the dockee device 110 was initially connected to at the time of docking, which IP address the portable device 110 currently has and which TCP/IP connections the portable device 110 currently has open (e.g. for streaming video), the handover to the new connection must include the configuration of the parameters of the connection to be set up by docking station 120 to the given access point. This handover may be dynamically configurable, since there may be multiple access points in the network to which the dockee-docking device could have been connected.

Figure 2:
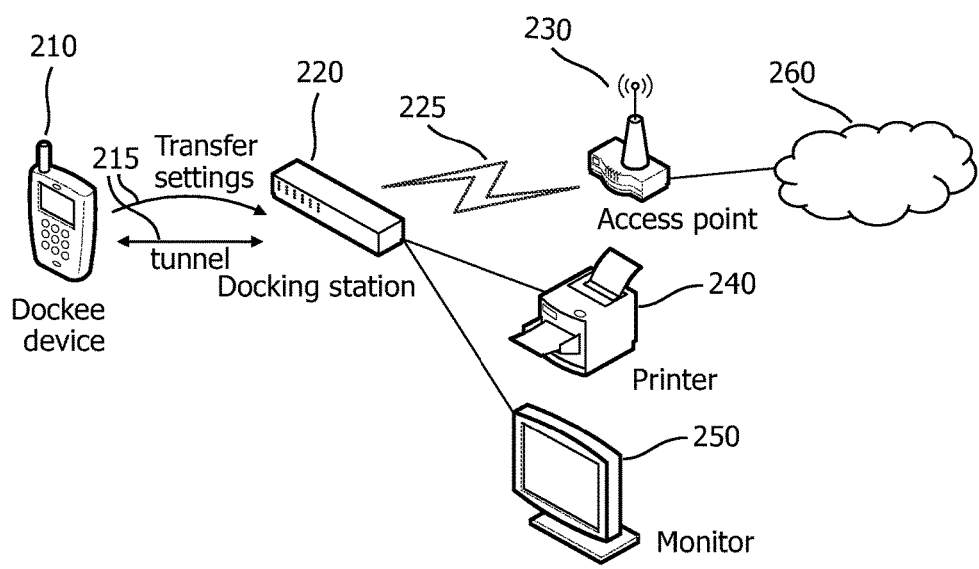
FIG. 2 shows a network environment after docking according to an inventive embodiment.

As shown in FIG. 2, the dockee device 210 is docked at the docking station 220. The dockee device 210 transfers to the docking station 220 the network settings, such as the SSID of the Wi-Fi access point 230, the security credentials of the Wi-Fi connection, MAC address of the device, current IP Address, preferred DNS server, etc., that the dockee device 210 had with the Wi-Fi access point 230 before docking. The docking station 220 assumes ("takes over") the connection between the dockee device 210 and the Wi-Fi access point 230 by using the network settings received from the dockee device 210 (e.g. IP address of the dockee device) for connecting to the Wi-Fi access point 230 and by tunneling the traffic between the dockee device 210 and the Wi-Fi access point 230 over connections 215 and 225. The dockee device 210 will then have access to the peripheral devices, such as a printer 240 and a large screen monitor 250 via the docking station 220 over link 215, and to the network 260 attached to access point 230 via the link 215, docking station 220 and link 225.

The existing connection to the access point 230 and existing network connections (e.g. for streaming video) should be seamlessly and automatically assumed ("taken over") by a connection through the docking station 220. Depending on the application, the access point 230 that the dockee device 210 is connected to may even change dynamically while docking. However, the handover process should preferably be transparent for the user and the applications of the dockee device 210.

In one embodiment, the connection between the dockee device 210 and the docking station 220 is a Wi-Fi Direct connection. Also the direct connection that the dockee device 210 had with the access point 230 may get interrupted or closed whilst configuring and setting up the connection between the docking station 210 and the access point 230. However, possible connection types may include other connection standards, next generation wireless standards or contending implementations.

In another embodiment, upon docking with the docking station 220 the dockee device 210 automatically reconfigures itself to use the tunneling connection to the docking station 220 for connecting to the access point 230. Thus, the traffic needs to be tunneled over the new Wi-Fi Direct connection between the dockee device 210 and the docking station 220.

In another embodiment new protocols are defined that enable the dockee device 210 to inform the docking station 220 about the WLAN connection credentials between the dockee device 210 and the access point 230. This provides information regarding which wireless identity the docking station 220 should assume for connecting to the access point 230. The docking station 220 then automatically takes over the IP address and other parameters of the portable device 210 to connect to the access point 230 on behalf of the portable device 210 and have the ability to tunnel the traffic to/from the portable device 210.

The new protocol supporting the handover can have many forms. In one embodiment, the protocol interactions are performed as part of a more complex protocol interchange for wireless docking, a protocol interchange that will also, for example, result in the dockee discovering a screen in the docking environment, and connecting to it. Another example is where the protocol interactions are based on using USB CDC or (R)NDIS interface commands over a Wi-Fi connection using a remote driver.

Figure 3:
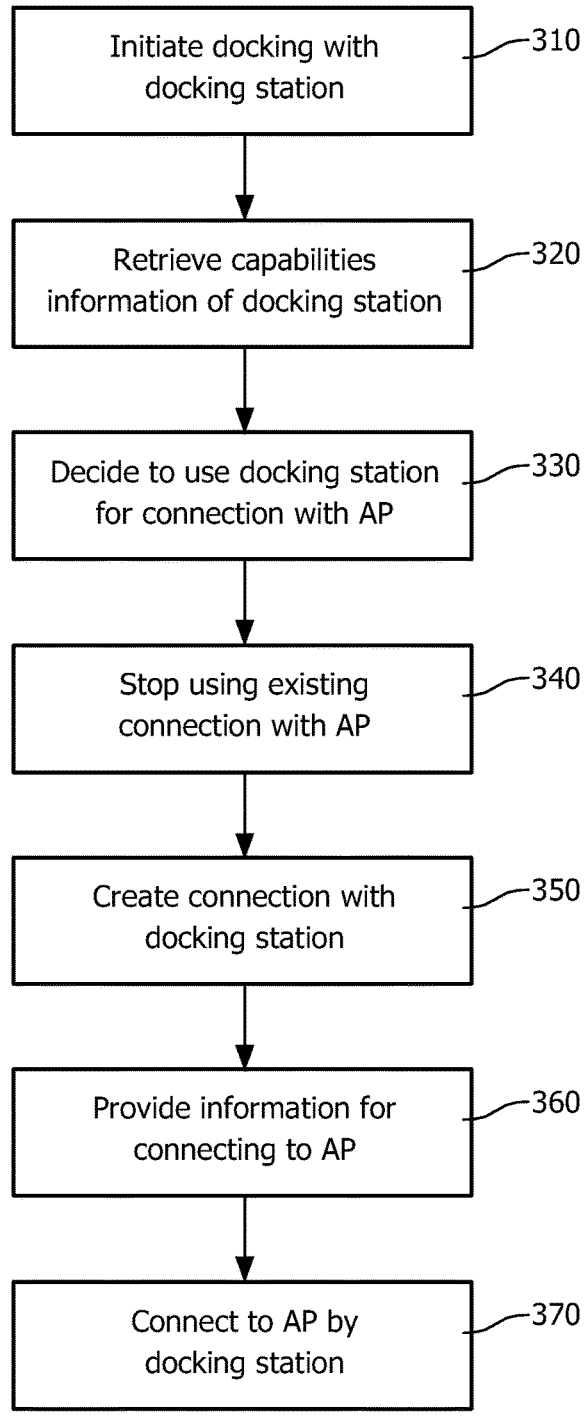
FIG. 3 shows a high level protocol flow of the handover process according to an inventive embodiment.

An example protocol flow is illustrated in FIG. 3. This example focuses on the handover only and is described next. Note that the order of events shown in FIG. 3 is not a mandatory sequence of events, but is only an illustration for ease of understanding. A different sequence or a simultaneous sequence of certain actions is envisioned.

Step 310: the dockee initiates docking with the docking station. To realize this step, a bidirectional communication channel between the dockee and the docking station is created by the dockee. This channel could be based on, e.g., a Bluetooth link between the two devices, a Wi-Fi connection to the docking station, or a TCP/IP protocol over the home network. In the latter case, the communication channel is realized via the access point. In this case both the dockee and the docking station have a (presumably) secure connection to the access point, so that they are both present on a single (local) IP (sub)network, allowing the dockee to open a communication channel using TCP/IP.

Step 320: the dockee uses the bidirectional communication channel to retrieve from the docking station information describing the capabilities of the docking station. This can be done, e.g., by sending a certain command 'GET/capabilitiesinfo' over the bidirectional channel, causing the docking station to answer by sending a byte sequence that contains a computer-readable description of the docking station capabilities.

Step 330: the dockee discovers that one of the capabilities of the docking station is that it is able to "take over" a connection between the dockee device and the access point, by connecting to the access point using the same network credentials that the dockee device is using for its connection to the access point, and by tunneling the traffic between the dockee device and the access point. The dockee decides (e.g., software in the dockee) to use this capability of the docking station.

Step 340: the dockee closes the current bidirectional communication channel with the docking station, stops using its built-in radio to communicate with the access point, and starts using its radio to establish a connection to the docking station. For example, the dockee, in no particular order, may close a Bluetooth connection with the docking station, as the bidirectional communication channel; close the Wi-Fi connection with the access point; and establish a Wi-Fi direct connection to the docking station.

Step 350: once this connection to the docking station is established, a second bidirectional communication channel between the dockee and the docking station is created by the dockee, this time over the connection just created. For example, the Wi-Fi direct connection to the docking station.

Step 360: the dockee sends a command to the docking station, over this second bidirectional communication channel, wherein the command indicates that the function to "take over" a connection between the dockee device and the access point should be activated by the docking station. This command contains necessary information (command parameters) needed to make this function work, e.g, to enable the docking station to do re-association and re-authentication with the access point. For example, for a Wi-Fi access point:

The SSID (and maybe the channel) of the Wi-Fi access point concerned. For example using an encapsulated USB RNDIS message OID_DOT11_DESIRED_BSSID_LIST.

The IP address that was used by the dockee to connect to the Wi-Fi access point.

The MAC address that was used by the dockee to connect to the Wi-Fi access point, the MAC address of the access point, and the MAC address of the 'destination' of the Wi-Fi association.

The WEP or WPA key used by the dockee to connect to the Wi-Fi access point. Other security credentials may include for example the Pairwise Master Key (PMK), the Pairwise Transient Key (PTK), the Group Temporal Key (GTK), the block cipher and the MIC code and the message sequence number, in order to create a proper CCMP or TKIP protected frame, if WPA-2 security is used. It is preferable if the dockee takes part in the challenge-response interchange with the access point, so that only a temporary key needs to be shared with the docking station, instead of a full copy of the credentials.

Setup parameters for the IP packet tunneling connection between the dockee and the docking station.

Step 370: the docking station activates the function as requested, and sets up a connection with the access point on behalf of the dockee, so that the dockee can interact again with the access point via the docking station.

Depending on the exact form of tunneling used, the command parameters will be different. In the above example, IP packets are sent by the dockee to the docking station via a tunnel, and the docking station is responsible for embedding them into Wi-Fi packets with WEP or WPA security before sending them onwards to the Wi-Fi access point. The docking station may need to change the source address in the IP header before doing so, in order to match the IP address that is used by the wireless docking station (previously used by dockee).

Here some of the steps that can be taken to make sure that the IP packet routing is set up correctly. Assume that dockee D was using IP address DIP in its communication with the access point. As part of having gotten an IP address DIP and having used the Wireless LAN provided by the given access point, several devices connected to wireless access point have, in their ARP cache, the MAC-to-IP address mapping (DIP, DMAC), whereby DMAC is the MAC address of the dockee. Devices use this information to send the packets to the proper MAC address. Hence, devices connected to the Wireless LAN may get confused if the IP packets are suddenly coming from another MAC address (i.e. the MAC address of the docking station HMAC instead of the dockee), unless some form of MAC spoofing is used whereby the docking station takes over the MAC address DMAC of the dockee. The following actions can be taken to overcome this problem.

IP address DIP used by the dockee to connect to the access point is sent to the docking station using e.g. using a configuration protocol over a Wi-Fi Direct connection DC between the dockee and the docking station. The IP addresses used within the Wi-Fi Direct P2P group formed by the Wi-Fi Direct connection are DIP2 for the dockee and HIP2 for the docking station respectively.

Assuming that the docking station does not take over the MAC address of the dockee, but uses its own MAC address HMAC instead, the docking station and/or the dockee (by the virtue of responding to tunneled IP packets received over connection DC from the docking station) need to answer any ARP requests for a MAC address belonging to its IP address DIP by sending an ARP reply message containing the mapping (DIP, HMAC). The docking station and/or dockee need to broadcast to the entire LAN a gratuitous ARP reply message, announcing the new mapping (DIP, HMAC). This will cause all devices connected the LAN to update their ARP caches, so that IP packets addressed to the IP address DIP of the dockee will be delivered to the correct MAC address, i.e. HMAC. In order for the docking station to be allowed by the access point to reuse address DIP, the dockee may have to deauthenticate (and disassociate) itself from the access point.

The docking station will use DIP as a source address in the IP header for IP packets received from the dockee over the Wi-Fi Direct connection DC that need to be sent by the docking station to the access point. Depending on the form of IP packet encapsulation, the dockee may set DIP as source address in the IP header by the dockee. Otherwise, the docking station needs to set the source address to DIP.

When the docking station receives any broadcast/multicast packet or any packet with DIP as destination address, it forwards them (transparently or by encapsulation) to the dockee over connection DC by using DIP2 as destination address. The dockee can use and respond to these IP packets as it would normally do when being directly to the access point, taking into account that any responses need to be tunneled back via connection DC through the docking station.

The dockee configures its internal background process, that refreshes the DHCP lease of its IP address, to keep refreshing it using the new mapping (DIP, HMAC).

The dockee resends the above the gratuitous ARP message a few times, to minimise the chance that transient packet delivery errors cause the presence of a stale ARP cache somewhere in a device connected to the LAN.

NOTE: the above scheme does not prevent the docking station to use its network interface to access the WLAN also by itself, using its own IP address HIP. It is possible that the single interface HI will host two IP addresses: DIP and HIP, and that other devices connected to the LAN will have, in their ARP tables, mappings from both these IP addresses to the single MAC address HMAC.

NOTE 2: The tunneling scheme described here works for IP traffic. However, for tunneling MAC protocol messages, some form of MAC spoofing may have to be used.

In an alternative embodiment, the tunnel is used by the dockee to send fully-formed pre-encrypted 802.11 packets to the docking station, leaving the docking station with the sole responsibility to transmit these packets without changing their internals. The pre-encrypted 802.11 packets may need to be encapsulated inside another IP packet in order to transfer the packet correctly using the connection between the dockee and the docking station. In this alternative embodiment, the parameters may be limited to specifying low-level radio settings, like the Wi-Fi channel to be used. In this alternative embodiment, the credentials needed to realize the connection are not part of the parameters sent by the dockee to the docking station to initiate the handover anymore, whilst the necessary credentials are pre-embedded by the dockee in each packet that is tunneled. The dockee device is entirely or partially responsible for constructing the correct frames that the docking station should send to the access point, for example by taking care of the WPA-2 encryption and sequencing of the frames as they are to be sent to the Access Point. The frames, as they are meant for the Access Point, are sent by the dockee device to the docking station. This is done by encapsulating/packaging these frames using the connection credentials of the connection between the dockee and the docking station. Since the communication channel between the dockee device and the docking station may provide its own encryption, the dockee may have to perform some kind of double encryption. The docking station that receives these messages can simply forward the frames, as they were constructed by the dockee, to the access point. Since the docking station does not need to encrypt the messages to the Access Point, it is not necessary for the security credentials to be transferred from the dockee device to the docking station during handover of the connection.

However, in this embodiment the docking station has to "impersonate" the dockee device as sender of the messages, i.e., by doing MAC spoofing and so on. So it is still necessary to send the MAC address of the dockee device to the docking station. Other parameters may include low-level radio settings, like the Wi-Fi channel to use, listen interval, etc. Letting the docking station use the same Wi-Fi channel that was used by the dockee device to communicate with the access point, before the dockee device connection got broken and handed over to the docking station, can speed up the handover process because the docking station can immediately send the data on the correct channel. It may also reduce suspicion by the Access Point due to suddenly receiving a subsequent frame on a different channel.

In one embodiment of a docking station, the docking station realizes the two connections between the dockee and the access point by having two separate Wi-Fi radio subsystems, or circuits. For example as shown in FIG. 2, with respect to the docking station 220, one connection is to connect to the dockee 210, and another connection is to connect to the access point 230. Each circuit may have a combination of hardware circuit elements and software components. However, it is also possible to make a docking station in which the two proposed connections share at least some hardware elements. For example, a docking station might contain a single chipset that is capable of concurrently using a) Wi-Fi 'n' (802.11n) communication over the 5 GHz band for communication with the dockee, and b) Wi-Fi 'g' (802.11g) communication over the 2.4 GHz band for communication with a Wi-Fi access point. The distinction between the two radio connections in the docking station is, therefore, seen as a logical distinction between connections that is not necessarily visible when inspecting the docking station at the hardware level. It is noted that concurrent usage of the antenna may be implemented in two ways;

A. There is a single physical antenna which is used to create to separate Wi-Fi link, each of the links using the antenna by time division B. There are at least two separate physical antenna, each being used for realizing a link In the above example, each link may be characterized that it is realized in the docking stating by having a separate MAC address and/or a separate IP address. In case of a single antenna and time division, one could use MAC address and/or Physical address spoofing.

Furthermore, the system according to the invention comprises a dockee device (110, 210) and a docking station (220), where the docking station comprises: first means for establishing a first network connection (215) for connecting to the dockee device (110, 210); and second means for establishing a second network connection (225) for connecting to a wireless network access point (130, 230);

wherein, the docking station (220) is configured to: in a first step to establish a secure wireless connection between the docking station and the dockee for receiving from the dockee device (110, 210) information for accessing the wireless network access point (130, 230), and in a second step to establish a secure wireless connection between the docking station_and the wireless network access point by connecting to the access point (130, 230) using the information received from the dockee device (110, 210) for the connection the docking station further configured to enable tunneling traffic between the dockee device (110, 210) and the wireless network access point (130, 230).

For concurrent usage in mode A (single physical antenna which is used to create to separate Wi-Fi link), the first and second means above are embodied by the same hardware circuit and corresponding software drives implementing the various layers, each of the links being created by time division use of the antenna. IP address and/or MAC address spoofing is used in this case to create the virtual antenna for realizing the secure connection with the access point.

For concurrent usage in mode B (two physical antennas), the first and second means are embodied by the first and second circuits as described with reference to the above figures. According to another embodiment of the invention, the second means for establishing a second network connection (225) correspond to a plug-in network interface device. E.g. a Wi-Fi dongle.

Figure 4:
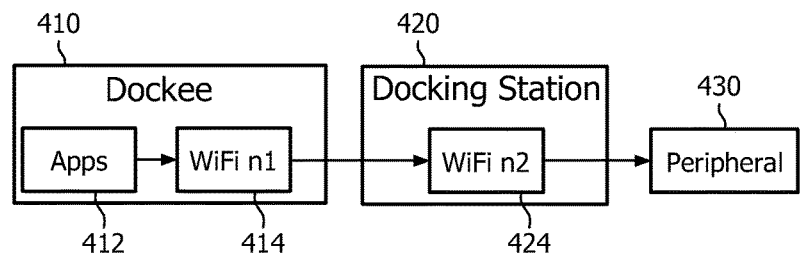
FIG. 4 shows a network environment for docking via a wireless connection according to Wi-Fi 'n' (802.11n) standard.

Currently, Wi-Fi is supported according to the IEEE 802.11n standard. However, the Wi-Fi 'n' data rate may not provide enough bandwidth to support some applications and allow for long term development. Consider, for example, the support for docking via a wireless connection according to the Wi-Fi 'n' (802.11n) standard, as shown in FIG. 4. FIG. 4 shows a dockee 410 running an application 412. The application 412 sends data via a connection between the WiFi n1 interface 414 of the dockee 410 and the WiFi n2 interface 424 of the docking station 420, to a peripheral device 430. For example, the arrows show the flow of video information from the apps to a screen (Peripheral 430), via a docking station 420. The Wi-Fi 'n' data rate may not be high enough, for example, to smoothly play video games in a docked situation on a high definition screen of the docking station. For example, a screen update rate of 1280×1920 pixels with 24 bits per pixel at 60 Hz needs to be supported. This amounts to a data rate of 3375 Mbit/s, which is way beyond the 300 Mbit/s promised in the most advanced Wi-Fi 'n' setup. Video compression can help to some extent, but in reality the use of a faster wireless system is needed.

A possible roadmap for wireless docking is that a next-generation wireless standard, significantly faster than Wi-Fi 'n', will be used. There is a lot of R&D on next generation wireless, often using the 60 GHz band and/or UWB modulation. The version of the standard based on 60 GHz band is sometimes referred to as a 'win60' standard.

A problem however is that, though there is a lot of R&D being done, it is not currently guaranteed that a single world-wide next generation wireless standard like 'win60' will emerge as the only viable remaining option among the contenders.

Therefore, it is desirable for a system and method implementing current standards to include flexibility to support possible future standards, where no single 'version 2' mandating the use of a single next-generation standard can be defined. The system and method described herein uses configurable interfaces to allow many possible next-generation wireless standards to be supported in a compatible way.

Figure 5:
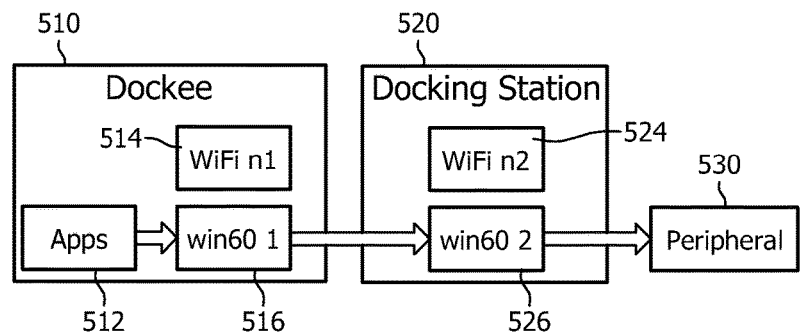
FIG. 5 shows a network environment for docking via a wireless connection incorporating a next generation wireless standard in all devices.

FIG. 5 shows an embodiment related to incorporating a next-generation wireless standard, for example a 'win60' wireless standard. Dockee 510 and docking station 520 both incorporate wireless next-generation 'win60' devices 'win60 1' 516 and 'win60 2' 526 that implement a next generation wireless standard. In an example where application 512 is a video application, the video information can now flow though a much 'fatter' pipe, indicated by the wider arrows, allowing smooth display at high definition resolutions at the peripheral device 530, e.g. high definition display screen. In one embodiment the Wi-Fi n1 514 and Wi-Fi n2 524 blocks are expected to be present for backwards compatibility with 'version 1' devices. This configuration advantageously provides end users with backward compatibility to Wi-Fi and forward compatibility with 'win60'.

Figure 6:
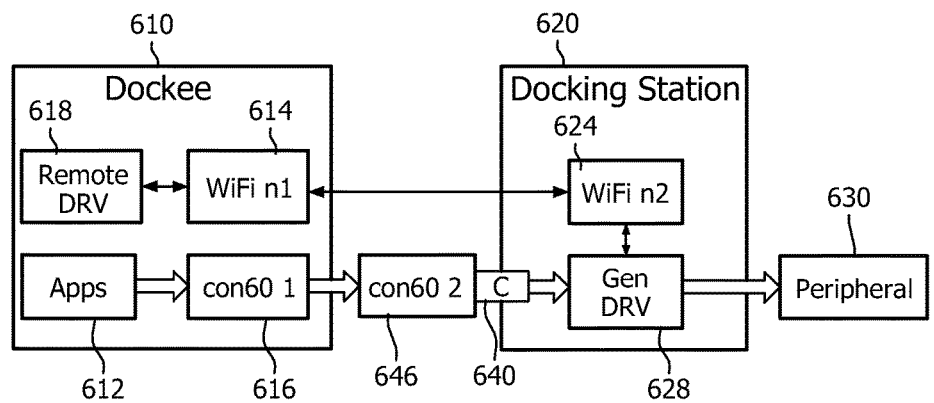
FIG. 6 shows a network environment for docking via a wireless connection using an implementation according to an inventive embodiment.

FIG. 6 shows another embodiment of the invention. According to this embodiment, the creator of a new dockee, e.g. a mobile phone vendor, chooses a particular next generation wireless standard. For ease of illustration the standard will be referred to as "a contender" in the next-generation wireless innovation space called 'con60'. As shown in FIG. 6 this contender next generation wireless standard is included in the dockee 610 by adding a device 616 implementing 'con60' 1. The 'con60' 1 device 616 implements the 'contender' wireless standard for the dockee 610. The objective is to use 'con60' 1 616 to send data (much faster than possible with Wi-Fi 'n') to the docking station 620, even though the docking station 620 is a 'version 1' docking station that has no built-in software to deal with the 'con60' protocol or with 'con60' devices. To implement the 'contender' wireless standard in the docking station, a second 'con60' 2 device 646, implementing 'con60', is connected to the docking station 620, using a connector 640. For example, the 'con60' 2 device 646 may be implemented as a USB dongle (USB device with a 'dongle' or 'stick' shape) and the connector 640 as a USB connector.

Although the docking station 620 may be able to recognize the connected 'con60' 2 device 646 as the USB device, the docking station 620 likely will be unable to use the device 646 because the docking station 620 lacks the software to initialize and operate the 'con60' 2 device 646. This problem is overcome in a novel way by incorporating a generic driver 'gen drv' 628 in the docking station 620, that can be controlled remotely by a specific remote driver 'remote drv con60' 618 in the dockee 610, so that the docking station becomes compatible with the 'con60' 2 device 646.

In a video application shown as apps 612, for example, the generic driver 'gen drv' 628 in the docking station 620 is able to pass on data that was wirelessly received by 'con60' 2 device 646 via processing elements in the docking station 620 to the peripheral 630, e.g. a screen. The video information can therefore flow through a much 'fatter' pipe.

In one embodiment the generic driver 628 in the docking station 620 does not contain all the intelligence (software) needed to fully control the specific connected 'con60' device 646. In this embodiment some of the software is present in the dockee 610—in a remote driver 618 that communicates with the generic driver 628 via the Wi-Fi 'n' interface. The connection between the two drivers 618 and 628 can happen even before the 'con60' 2 device 646 is initialized, via the (legacy, lower speed) Wi-Fi 'n' connection between Wi-Fi N1 device 614 and Wi-Fi n2 device 624 of the dockee 610 and the docking station 620, respectively. After the connection via the 'con60' 2 protocol is established, the remote driver control may also be implemented, in whole or in part, via the data link over the 'con60' devices.

Figure 7:
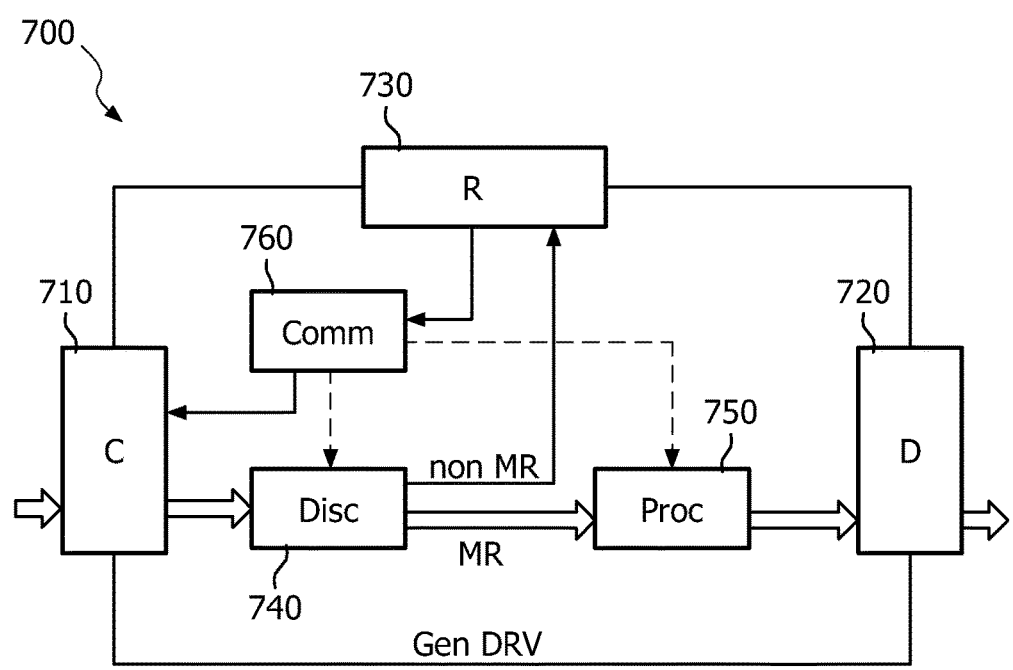
FIG. 7 shows a generic device driver according to an inventive embodiment.

FIG. 7 shows example details of the generic remote network driver. Different embodiments provide different implementation choices.

The generic driver 700 in FIG. 7 is shown with 3 connections C 710, D 720, and R 730. All 3 connections implement and support a bidirectional message flow: messages to the generic driver and messages from the generic driver.

All connections of the driver 700 are shown as carrying a bidirectional message flow for ease of illustration. However, other ways of modeling the connections, for example as channels for packets, or as object interfaces on which method calls can be made, are also valid. In the following description, the 'message' view is chosen somewhat arbitrarily as a notational convention.

A specific implementation of USB is discussed for the following embodiment. At different levels in the USB stack, different types of messages are defined. At the lowest level there are USB 'packets' flowing over the wires of the USB connector. At a higher level, USB groups packets into 'transactions'. A transaction can be interpreted as either a message from the USB device, or a message to the USB device. In messages to the device, USB makes a distinction between transactions that have the purpose of carrying payload data and transactions that have the purpose of controlling the device, e.g. changing settings. Preferably, to simplify the construction of the generic driver, if connection C is realized according to USB, the messages flowing over it will map to USB transactions, not USB packets. The mapping between transactions and USB packets, as standardized in USB, is then left to the lower level USB stack inside the docking station, and is of no concern to the builder of the generic driver.

FIG. 7 shows the connections and internals of the generic driver 700:

C 710 is the connection to the wireless device 'con60' 2

D 720 is the connection to the rest of the internals of the docking station

R 730 is the connection to the remote driver 'remote drv con60'

'Disc' is a message discriminator as outlined below, separating messages into two types:

MR: messages coming in over C 710 that contain (parts of) packets received wirelessly by 'con60' 2, e.g. packets containing video data for a peripheral connected to the docking station), and non MR: other messages 'Proc' is a message processor as outlined below 'Comm' is a command interpreter as outlined below The generic driver 700 can send and receive messages over connection C 710 to the connected device 'con60' 2, even if the generic driver 700 is not able to understand some or all of the contents of the messages. This may occur when the generic driver 700 does not have the built-in software to interpret and act on some or all of the contents of the messages. This is because modern connector interfaces, like USB, define message transfer mechanisms that are independent of the detailed message contents.

If, by contrast, there is knowledge of how con60 2 works exactly, it is therefore possible to define, given the set of all possible messages M that C 710 can send to the generic driver when it is in operation, a subset MR consisting of those messages that contain the wireless data packets that con60 2 has received from the dockee.

Therefore, the generic driver is constructed in such a way that there is a discrimination mechanism 'Disc' 740 inside that separates the messages MR from other messages received over C 710.

This separation can make use of configuration information supplied by the remote driver, which knows the details of how con60 2 works, but in other embodiments the separation might be possible even without needing any configuration—it all depends on exact nature of the range of devices that need to be supported by the generic driver.

The generic driver is further constructed so that the separated messages MR are sent to a processing element 'Proc' 750, that can, after being configured by the remote driver or without needing any prior configuration, extract the wireless packet payload data out of the messages, and output the extracted packet data over D 720 to the rest of the docking station.

Some embodiments of using USB for connector C 710 is discussed here, where USB defines a specific device class 'USB communications device class (or USB CDC)' that can be used by implementers of USB wireless interface devices, like con60 2. This class defines a standardized way for a CDC device to send a received (wireless) data packet to its driver, i.e., standardized encoding of how packet payload data is sent over the USB interface. This makes the construction of 'Disc' 740 and 'Proc' 750 elements powerful enough to handle many possible USB CDC wireless devices and allows these elements to be constructed as 'low level' hardware or software elements, so that the CPU(s) in the docking station is not heavily loaded with the task of discriminating the messages.

Microsoft® has defined another specification for the behavior of USB network devices, called 'Remote Network Driver Interface Specification (RNDIS),' that differs from USB CDC. In one embodiment, the 'Disc' 740 and 'Proc' 750 elements are flexible enough to support both CDC and RNDIS type devices. It is envisaged that a wireless docking protocol specification contains guidelines to creators of USB devices like the con60 device, so that they can make sure that their device is compatible with the envisaged generic driver as required by the wireless docking protocol. Note that 'Proc' 750 also likely needs to strip or interpret a PHY/MAC layer protocol header from the start of each packet as received over USB. Typically, this header contains address fields that need to be interpreted before the packet payload can be passed to D 720. To do this correctly configuration parameters supplied by the remote driver are relied upon.

The generic driver is further constructed so that at least some, preferably all, of the messages outside of the subset MR are passed via R 730 to the remote driver running in the dockee.

The generic driver and remote driver can also be used for embodiments whereby a virtual/virtualized USB CDC or RNDIS device is used on top of an existing radio embedded in the docking station.

The generic driver is further constructed so that it can receive messages from the remote driver over R 730, and interpret, using a command interpreter 'Comm' 760, these messages as commands. There are some commands that cause the generic driver to send specific messages (e.g. enclosed as payload in the commands) to the attached device con60 2 via C 710. There might be other commands that can be used to configure specific elements of the generic driver.

In a particular embodiment, in a generic driver needing no configuration at all, the command interpreter might be replaced by a plain connection that forwards all messages incoming over R 730 to C 710. This construction of the generic driver allows the remote driver to initialize, configure, and monitor the device con60 2, in order to initialize and operate a connection according to the con60 protocol between dockee and docking station. It further allows the remote driver to do all the device management tasks that are needed to keep the connection working, e.g. the remote driver can implement a control loop is needed to set the right transmit and receive power parameters in the con60 device connected to C 710.

The system is therefore constructed to be able to use at least an existing (for example, lower-capacity) connection between the dockee and the docking station to create a data path between connector R 730 on the generic driver and the remote driver, so that the higher-capacity connection can be bootstrapped.

One embodiment realizes bidirectional communication over the con60 link by adding additional elements to the generic driver, mirroring Proc and its connections, that can receive data packets from D 720, and forward them to C 710 for sending by con60 2.

Some embodiments also add extra mechanisms in the generic driver, probably configurable mechanisms, with the goal of reducing the number of messages that have to be passed from and to the remote driver. The generic driver will be able to perform some management tasks that con60 2 needs without contacting the remote driver.

In terms of allowing various contending next generation wireless technologies to be used together while minimizing hassles for end users about compatibility, various embodiments of the wireless docking protocol specification should:
- require all docking devices to have a generic driver of a particular construction, and a connector C of a particular type, preferably USB,
- recommend that dockee device makers who incorporate standards like Con60 into their device also implement a remote driver for con60, and make available to their customers devices of type conn60 2, with instructions to connect these to their existing docking station(s), and
- recommend that makers of USB versions of next generation wireless devices adhere to one of the message coding schemes that can be handled by the standardized generic driver.

It should be noted that as an alternative solution, one could define and create a con60 2 device that has, on its own USB stick, a microcontroller running its own driver software, and being able to communicate directly over USB to the interface port D, as shown in FIG. 7, without needing a generic driver. However, this alternative may require extra hardware and software in the USB stick. Also, adopting this alternative solution would mean that the con60 USB sticks usable with docking stations would be different from the lower-cost con60 USB sticks that could be used with generic PCs, because the generic PC sticks would not need the microcontroller since a specific driver can be installed on the PC itself. Certain embodiments herein allow the USB sticks intended for use with PCs to be also used with wireless docking stations, creating advantages in terms of economies of scale.

Another embodiment herein provides a configuration of the generic driver by loading executable code, rather than configuration parameters, for example. The executable code might run in a virtual machine. This resolves compatibility and security concerns. When executable code is used, the internals of the generic driver as shown in FIG. 7 could, in an embodiment, all be replaced by a single code execution environment, so that the code can interface with the three connections C, D, and R, as shown in FIG. 7.

While certain embodiments herein focus on devices con60 2 that make wireless connections, the same approach could be used to integrate other types of devices with the docking station without having a built-in driver in the docking station. Examples are webcams or display devices.

As a further option, a docking station may be built with a 'hidden' space for the USB stick(s) that implement con60 (or other contender protocols), so that the presence of the stick, or multiple sticks will not affect the external appearance of the docking station. A wireless docking protocol specification may recommend or require specific dimensions for these hidden spaces, and recommend shapes or antenna locations for the USB sticks.

Note that while the most preferred embodiment has the 'Disc' component 740 send all non-MR messages to the remote driver, 'Disc' component 740 could also be built to ignore a large class of messages it does not recognize. For example, dropping messages it does not recognize. As long as these messages cannot occur, or are not relevant, this will not impede correct operation of the docking station.

Certain embodiments herein are applicable to wireless docking products according to a wireless docking protocol specification or a proprietary implementation.

It is intended that the foregoing detailed description be understood as an illustration of selected forms that various invention can take and not as a limitation to the definition of the inventions. It is only the claims, including all equivalents that are intended to define the scope of each claimed invention.

Most preferably, the principles of the inventions are implemented as any combination of hardware, firmware and software. Moreover, the software is preferably implemented as an application program tangibly embodied on a program storage unit or non-transitory computer readable storage medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

The invention claimed is:

1. A wireless docking system, comprising:
a dockee device and a docking station, wherein the docking station is configured to:
establish a bidirectional communication channel between the docking station and the dockee device, wherein the dockee device has access information for accessing a wireless network access point via an initial connection between the dockee device and the wireless network access point;
transmit capability information of the docking station to the dockee device via the bidirectional communication channel in response to a request from the dockee device, the capability information including a capability of the docking station to take over the connection between the dockee device and the wireless network access point;
establish a secure bidirectional communication channel between the docking station and the dockee in order to receive the access information from the dockee device, wherein the bidirectional communication channel is closed when the secure bidirectional communication channel is established;
receive a command from the dockee device to take over the connection between the dockee device and the wireless network access point using the access information; and
enable a tunneling connection between the dockee device and the wireless network access point via the docking station acting as a proxy.

2. The wireless docking system according to claim 1, wherein the access information includes an IP address or a MAC address of the dockee device.

3. The wireless docking system according to claim 1, wherein the secure bidirectional communication channel is established via a Wi-Fi Direct connection.

4. The wireless docking system according to claim 2, wherein the docking station is further configured to change a source address in an IP header to match the IP address used by the dockee device.

5. The wireless docking system according to claim 2, wherein the dockee device is automatically reconfigured in order to use the tunneling connection for connecting to the wireless network access point.

6. The wireless docking system according to claim 5, wherein the dockee device is further configured to encrypt and sequence frames sent to the wireless network access point such that the dockee device is at least partially responsible for constructing wireless frames that the docking station sends to the wireless network access point.

7. The wireless docking system according to claim 1, wherein the docking station further comprises:
a built-in first network interface configured to connect to the dockee device; and
a plug-in network interface device, wherein the dockee device comprises a remote device driver and the docking station comprises a generic device driver connected to the plug-in network interface device, the generic device driver being initialized or controlled by the dockee device to enable sending of data from the dockee device to the docking station via a wireless connection between the dockee device and the plug-in network interface device.

8. The wireless docking system according to claim 7, wherein the generic device driver comprises a message discriminator to separate messages coming from the plug-in network interface that contain a wireless packet data payload apart from other messages.

9. The wireless docking system according to claim 7, wherein the generic device driver comprises a message processor to extract wireless packet payload data out of the messages received from the plug-in network interface device.

10. The wireless docking system according to claim 7, wherein the generic device driver comprises a command interpreter to interpret messages received from the remote device driver into commands that affect the generic device driver, the generic device driver being able to work with a specific plug-in network interface device.

11. A wireless docking station, comprising:
a network circuit configured to establish a bidirectional communication channel between the docking station and a dockee device, wherein the dockee device has access information for accessing a wireless network access point via an initial connection between the dockee device and the wireless network access point; and
at least one processor configured to:
transmit capability information of the docking station to the dockee device via the bidirectional communication channel in response to a request from the dockee device, the capability information including a capability of the docking station to take over the connection between the dockee device and the wireless network access point;
establish a secure bidirectional communication channel between the docking station and the dockee in order to receive the access information from the dockee device, wherein the bidirectional communication channel is closed when the secure bidirectional communication channel is established;
receive a command from the dockee device to take over the connection between the dockee device and the wireless network access point using the access information; and
enable a tunneling connection between the dockee device and the wireless network access point via the docking station acting as a proxy.

12. A dockee device, comprising:
a network interface device; and
at least one processor configured to store access information for accessing a wireless network access point via an initial connection between the dockee device and the wireless network access point;
the at least one processor further configured to:
receive capability information of a docking station via a bidirectional communication channel in response to a request from the dockee device, the capability information including a capability of the docking station to take over the connection between the dockee device and the wireless network access point,
establish, using the network interface device, a secure bidirectional communication channel between the docking station and the dockee device, wherein the bidirectional communication channel is closed when the secure bidirectional communication channel is established;
transmit to the docking station the access information via the secure bidirectional communication channel, wherein the access information is used by the docking station to enable a tunneling connection between the dockee device and the wireless network access point, and wherein the dockee device is automatically reconfigured in order to use the tunneling connection for connecting to the wireless network access point via the docking station acting as a proxy.

13. The dockee device according to claim 12, wherein the at least one processor is further configured to encrypt and sequence frames sent to the access point such that the dockee device is at least partially responsible for constructing wireless frames that the docking station sends to the access point.

14. A method for wirelessly docking a dockee device with a docking station, the method comprising:
establishing a bidirectional communication channel between the dockee device and the docking station, wherein the dockee device has access information in order to access a wireless network access point via an initial connection between the dockee device and the wireless network access point;
transmitting, by the docking station, capability information of the docking station to the dockee device via the bidirectional communication channel in response to a request from the dockee device, the capability information including a capability of the docking station to take over the connection between the dockee device and the wireless network access point;
establishing a secure bidirectional communication channel between the docking station and the dockee in order to receive the access information from the dockee device, wherein the bidirectional communication channel is closed when the secure bidirectional communication channel is established;
receiving a command from the dockee device to take over the connection between the dockee device and the wireless network access point using the access information; and
providing a tunneling connection between the dockee device and the wireless network access point via the docking station acting as a proxy.

15. The method according to claim 14, further comprising:
initializing or controlling a generic device driver in the docking station by the dockee device to enable sending of data from the dockee device to the docking station via the secure bidirectional communication channel between the dockee device and a plug-in network interface device.

\* \* \* \* \*